May 5, 1931.  C. B. ROHLAND  1,803,769
ROTARY VEGETABLE CUTTING MACHINE
Filed June 26, 1929   3 Sheets-Sheet 1
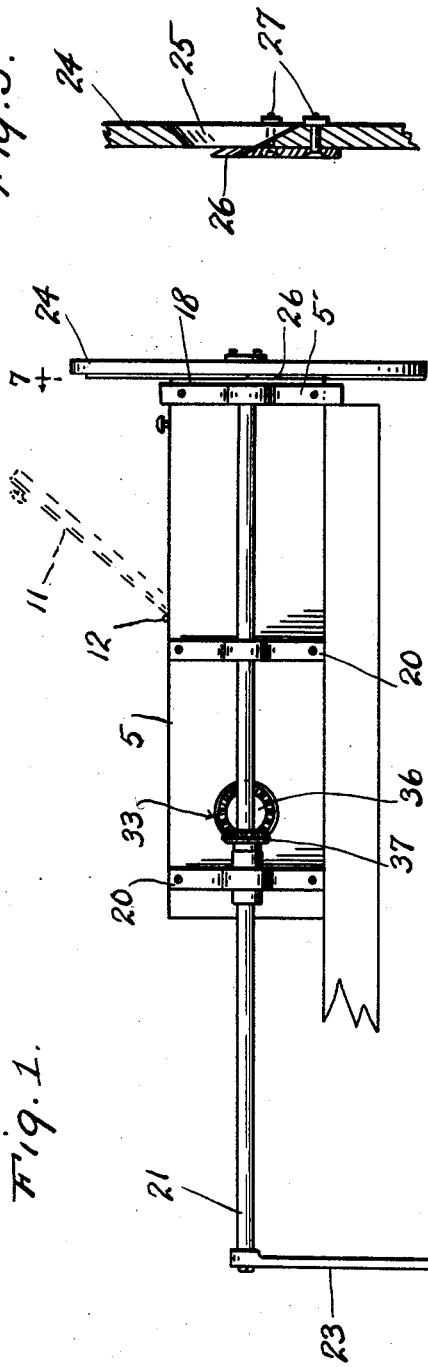
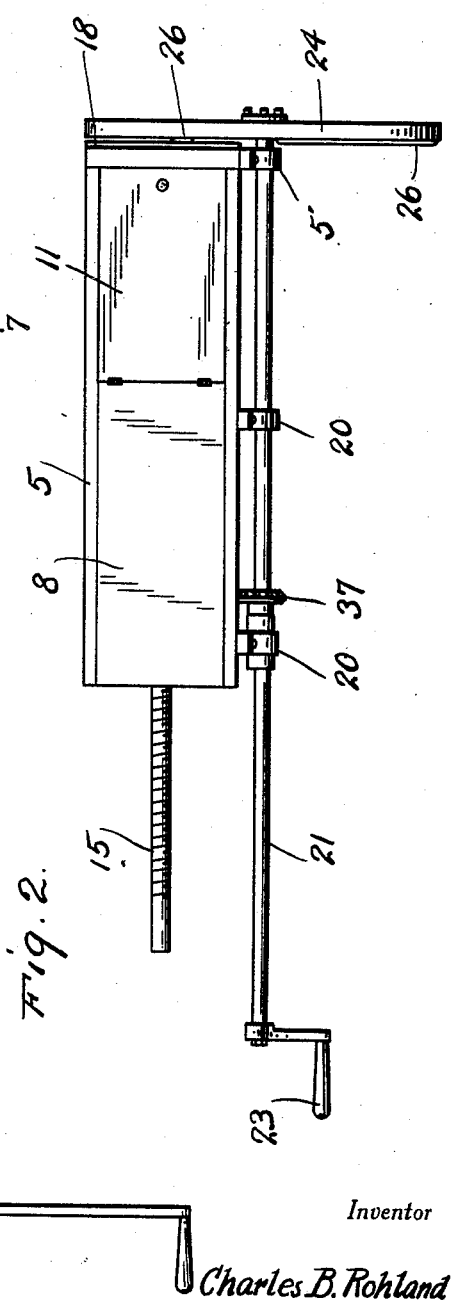
Inventor
Charles B. Rohland
By Clarence A. O'Brien
Attorney

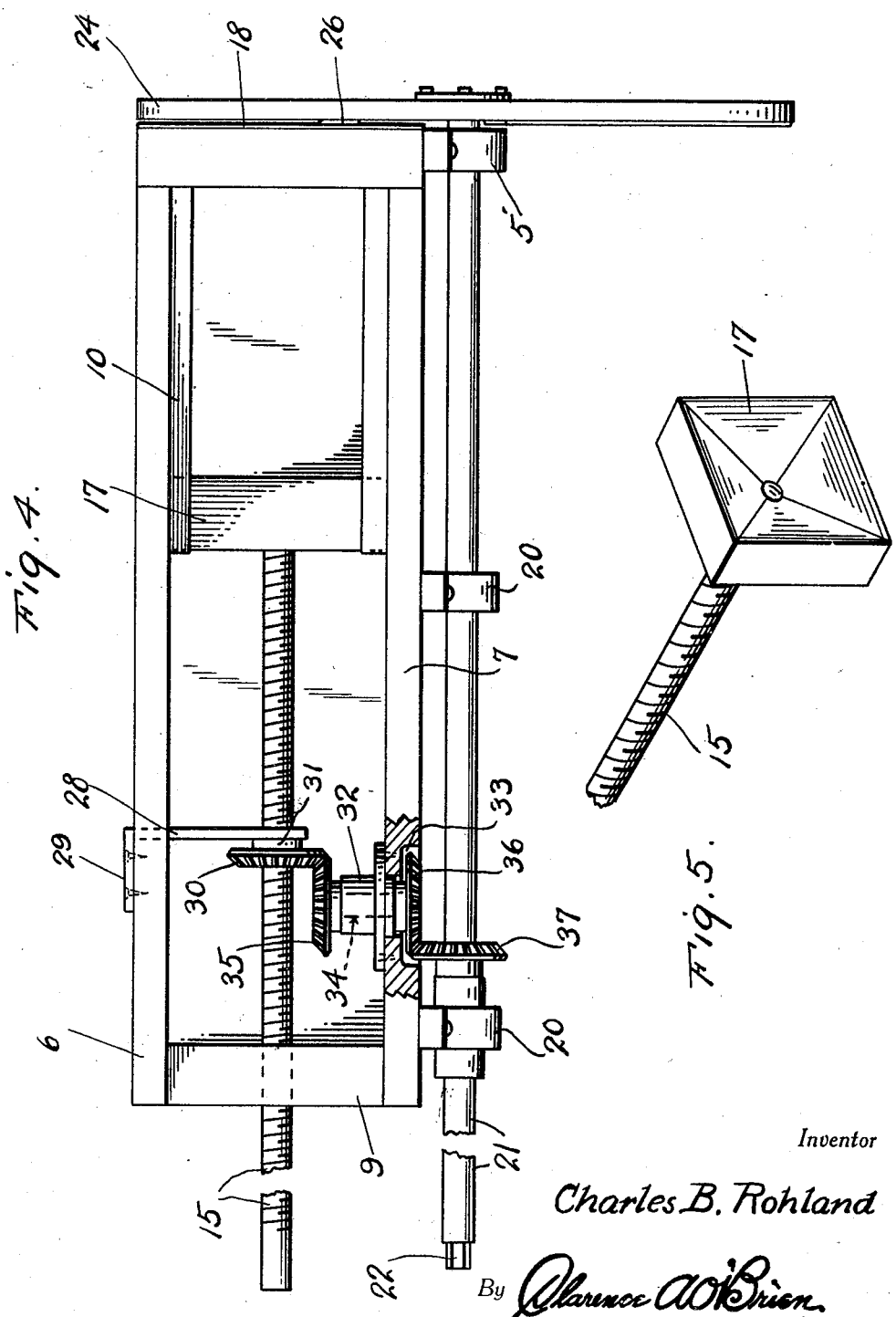

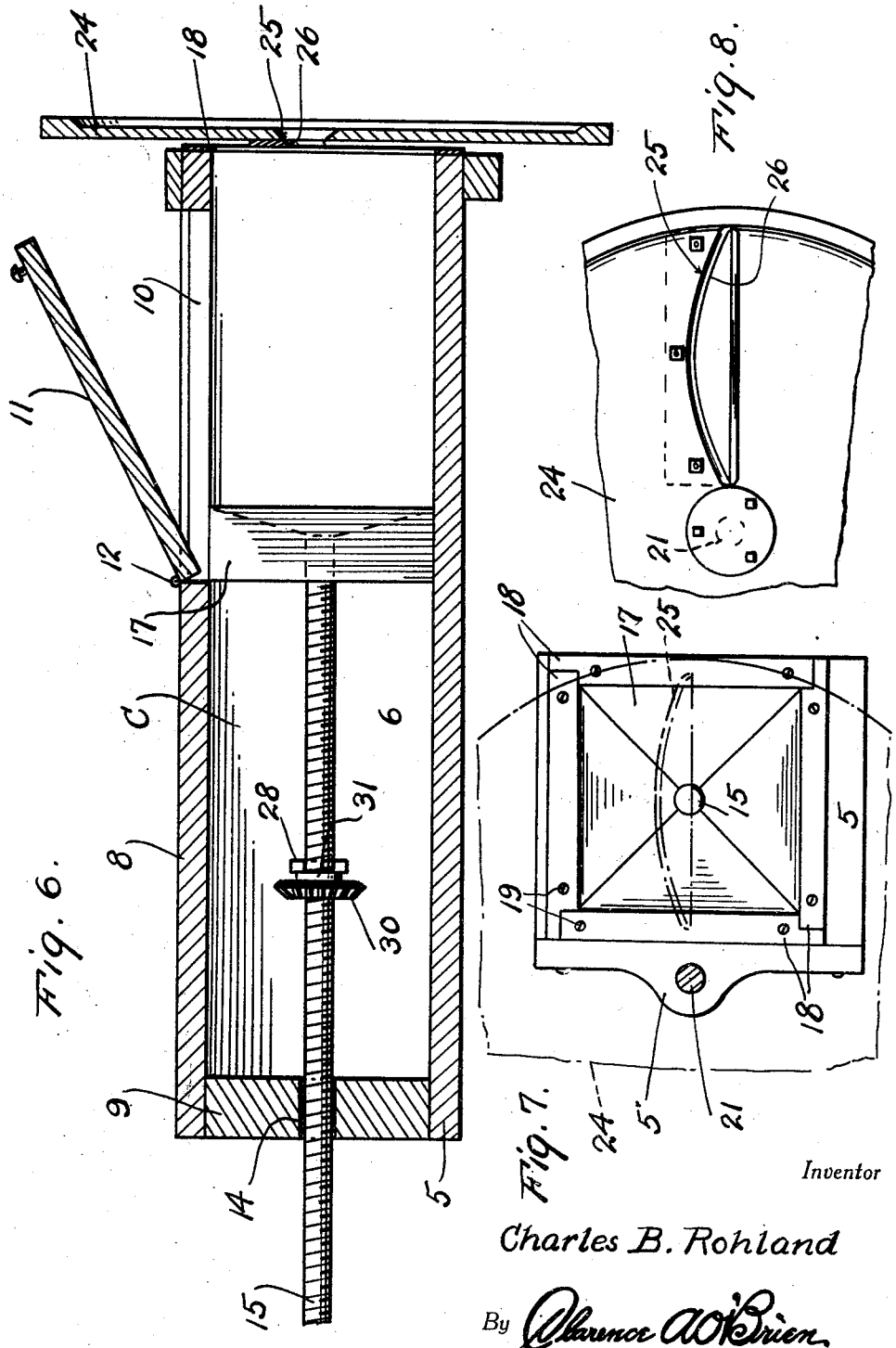

Patented May 5, 1931

1,803,769

UNITED STATES PATENT OFFICE

CHARLES B. ROHLAND, OF BARBERTON, OHIO

ROTARY VEGETABLE CUTTING MACHINE

Application filed June 26, 1929. Serial No. 373,887.

The present invention relates to a machine for cutting vegetables, fruits and the like, and has for its prime object to provide a machine of this nature especially well adapted for cutting slaw.

Another important object of the invention resides in the provision of a machine of this nature including the combination of a feed box with following means therein and a rotary cutter means whereby the following means and rotary cutter are simultaneously operated.

A still further very important object of the invention resides in the provision of a vegetable cutter of this nature which is exceedingly simple in its construction, inexpensive to manufacture, strong and durable, compact and convenient in its arrangement of parts, thoroughly efficient and reliable in use and operation, and not likely to easily become out of order.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the machine embodying the features of my invention, Figure 2 is a top plan view thereof, Figure 3 is a fragmentary detail section through the rotary cutter showing one of the blades in section, Figure 4 is a top plan view with the top removed, Figure 5 is a perspective view of the follower, Figure 6 is a vertical longitudinal section through the machine, Figure 7 is a view taken substantially on the line 7—7 of Figure 1, and, Figure 8 is a fragmentary elevation of the rotary cutter showing one of the blades.

Referring to the drawings in detail, it will be seen that the casing C forms a box-like hopper and comprises a bottom 5, side walls 6 and 7, a top 8, and an end wall 9. The front portion of the top 8 is provided with an opening 10 and a hinged closure 11 is mounted as at 12 to close this opening 10.

The end wall 9 is provided with a central opening 14 through which extends a threaded shaft 15 fixed to a follower block 17 mounted for reciprocation in the casing C. The front edges of the bottom 5, walls 6 and 7, and the top 8 are provided with guard plates 18 held in place by screws 19 or in any other suitable manner.

A plurality of bearings 20 are mounted on the side wall 7 and has journalled therein a shaft 21 which is squared at its rear extremity as is indicated at 22 so that a hand crank 23 may be engaged therewith for turning the shaft. Of course the shaft 21 may be turned by any other suitable means if so desired.

On the front end of the shaft 21 is disposed the rotary cutter, which comprises a disk 24 having a plurality of crescent shaped openings 25 therein, and bolted thereto a plurality of blades 26 which partially extend over these openings 25. The blades are bolted or otherwise secured in place as at 27.

An angular bracket 28 extends through the wall 6 having a leg 29 fixed thereto, while the other leg has an opening through which the threaded shaft 15 extends. A gear 30 is threaded on the shaft 15 and is of the bevel type and is formed with a collar 31 which abuts the bracket 28. A bearing 32 is mounted on the inner side of the wall 7 in registry with an opening therein which is countersunk as at 33.

A shaft 34 is journalled through the bearing 32 and has a bevel gear 35 at the inner end thereof meshing with the bevel gear 30 and has a bevel gear 36 at the outer end thereof disposed in the countersunk portion 33 and meshing with a gear 37 fixed on the shaft 21.

When the shaft 21 is turned it will be seen that the cabbage, or any other vegetable or fruit in front of the follower will be moved forwardly toward the open end of the casing C to be engaged by the simultaneously rotating rotary cutter.

It is thought that the construction, operation, utility and advantages of the invention will now be quite apparent to those skilled in this art without a more detailed description thereof. It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

In a vegetable cutter of the class described including an elongated casing and a follower slidable in the casing, means for shifting the follower longitudinally in the casing comprising a threaded shaft fixed to the follower and disposed longitudinally in the casing, a gear threaded on the shaft having a collar thereon, a stop bracket mounted on the casing and extending thereinto through which the shaft slidably extends and with which the collar on the gear engages, a shaft extending transversely through an opening in one side of the casing, a bearing for the second named shaft extending through the casing, a gear on the inner end of the second named shaft meshing with the first mentioned gear, said first named gear being retained against longitudinal movement in the casing by the bracket and the second named gear, a third gear fixed on the outer end of the transverse shaft, bearings on one side of the casing, a shaft journaled for rotation in the bearing, a gear fixed on the last mentioned shaft meshing with the third mentioned gear and cutting means fixed on one end of the last mentioned shaft and disposed at one end of the casing.

In testimony whereof I affix my signature.

CHARLES B. ROHLAND.